(No Model.)
J. RICHARDSON.
METHOD OF MANUFACTURING PNEUMATIC TIRES.
No. 539,707.                    Patented May 21, 1895.
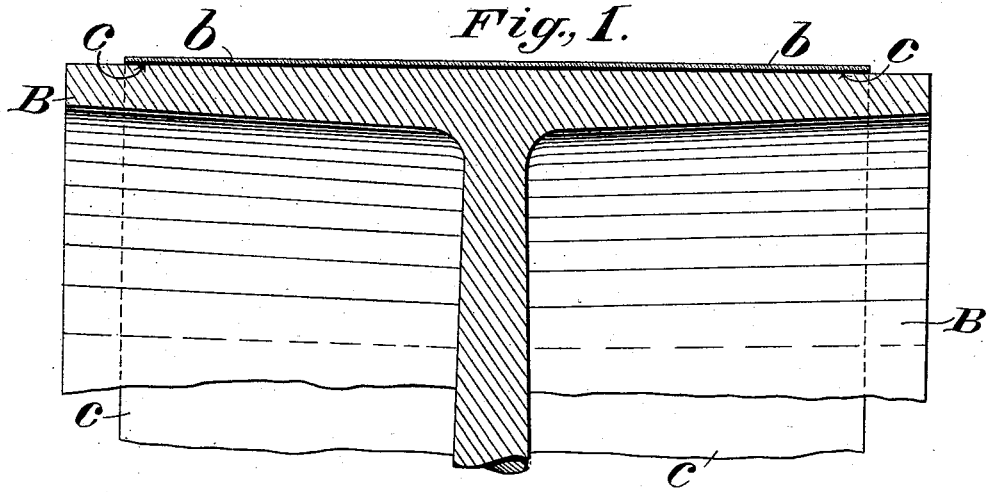
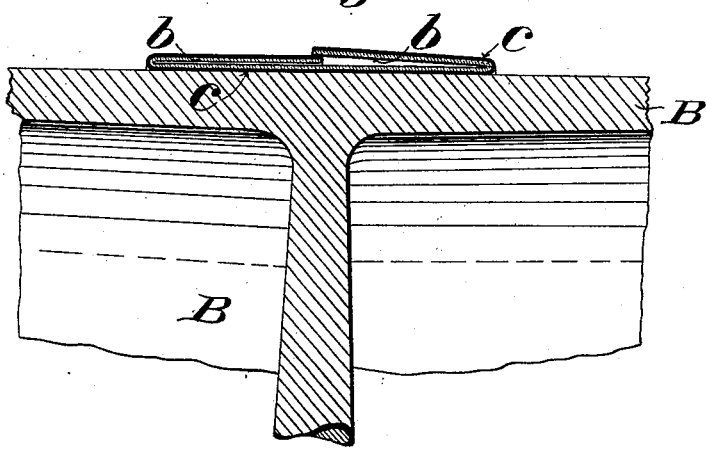
Witnesses:
W. Rees Edelin,
Geo. Lewis
Inventor,
John Richardson
by Pollok & Mauro,
his attorneys.

UNITED STATES PATENT OFFICE.

JOHN RICHARDSON, OF PASSAIC, NEW JERSEY, ASSIGNOR TO THE NEW YORK BELTING AND PACKING COMPANY, LIMITED, OF NEW YORK, N. Y.

METHOD OF MANUFACTURING PNEUMATIC TIRES.

SPECIFICATION forming part of Letters Patent No. 539,707, dated May 21, 1895.

Original application filed August 6, 1894, Serial No. 519,540. Divided and this application filed February 13, 1895. Serial No. 538,256. (No model.)

*To all whom it may concern:*

Be it known that I, JOHN RICHARDSON, of Passaic, New Jersey, have invented a new and useful Improvement in Methods of Manufacturing Pneumatic Tires, which is fully set forth in the following specification.

This invention has reference to the manufacture of hollow or tubular tires intended to be inflated by air or other fluid under pressure, and has more particular reference to the manufacture of the outer sheath or cover such as described in my application filed August 6, 1894, Serial No. 519,540, whereof the present application is a division and continuation. The mode of procedure in making the cover or sheath as described in said prior application, consists in vulcanizing the tube composed of layers of rubber and fabric, while stretched in a flattened condition upon the periphery of a drum. By this method a tire is formed which in its deflated condition has an elliptical shape in cross-section, the major axis of the ellipse being parallel with the axis of rotation of the tire and has at the ends of such major axis creases or lines of flexure, so that the tire has the property of a double elliptical spring. In carrying out the said invention, it is provided in my aforesaid application that the tube may be built up by wrapping the several layers of rubber and fabric upon a rod or mandrel, and after removing it from the rod or mandrel stretching the tube upon the drum; or as an alternative method that the tube may be formed by winding the several layers or sheets of rubber and fabric flat upon the drum, then folding over the superposed layers upon themselves, thus forming a flat tube and finally vulcanizing. It is the latter of these two modes of procedure which constitutes specifically the subject-matter of the present application. When the tube is formed upon the drum as just described, it is covered by any suitable means to hold it in a flattened condition, and to protect it during vulcanization. Preferably I employ for this purpose wrappings of cloth, these being economical and convenient, and for the reason also that the contact of the cloth with the rubber imparts a cloth finish to that half of the circumference of the tire which is to be cemented to the wheel. The tube may, however, be held on by sheet metal or by any other material, or by means of rings, clamps or bands, as will be readily understood. The method is applicable to the manufacture of tires of the "hose-pipe" variety, as well as to inner-tube tires.

The invention is illustrated in the accompanying drawings, in which—

Figure 1 shows in cross-section the several layers or strips of which the sheath or tire is to be composed stretched flat upon the periphery of a drum, and Fig. 2 is a similar view showing the strips folded over to form a flat tube prior to vulcanization.

The rubber sheet *c* which is to form the outer surface of the sheath or tire, is cut to a width equal to the circumference of the cross-section of the tire (allowance being made for the proper lap when a lap-joint is formed) and is then wound flat upon the periphery of the drum B. Upon the sheet *c* is placed a layer of fabric (represented in the drawings by the strip *b*) such as usually employed in the manufacture of tires, there being one or more plies of such fabric as desired. The surface should then be dusted with soapstone to prevent adhesion, and the edges of the several layers are folded over, thus forming a flat tube as indicated in Fig. 2. I prefer in order to obtain a strong seam, that the meeting edges of the strips should overlap, as shown in Fig. 2, forming a lap-joint. The tube thus formed is then wrapped with cloth, or covered and held by any suitable means, and vulcanized as described in my aforesaid application.

The portion of the tube which, during vulcanization is in contact with the periphery of drum B, is the wearing or tread portion of the completed tire, and this portion of the tire will have a smooth metallic finish without fin, rib, or mold-mark. The seam formed by the meeting edges of the strips will be in contact with the rim or felly of the wheel.

Having now fully described my said invention, what I claim therein is—

In the art of making rubber tires, the improvement which consists in stretching a sheet of unvulcanized rubber upon a drum, placing upon it a layer or layers of fabric, folding over the edges of the several layers until they meet and form a tube, and vulcanizing the whole in a flattened condition, substantially as described.

In testimony whereof I have signed this specification in the presence of two subscribing witnesses.

JOHN RICHARDSON.

Witnesses:
C. H. OAKLEY,
CHARLES E. ALDOUS.